(12) United States Patent
He et al.

(10) Patent No.: US 7,768,925 B2
(45) Date of Patent: Aug. 3, 2010

(54) METHOD OF DOMAIN SUPERVISION AND PROTECTION IN LABEL SWITCHED NETWORK

(75) Inventors: Jianfei He, Shenzhen (CN); Xiaodong Li, Shenzhen (CN); Xingyue Quan, Shenzhen (CN); Wei Fu, Shenzhen (CN); Chaogang Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 199 days.

(21) Appl. No.: 11/574,376

(22) PCT Filed: Mar. 29, 2006

(86) PCT No.: PCT/CN2006/000533

§ 371 (c)(1),
(2), (4) Date: Jul. 24, 2007

(87) PCT Pub. No.: WO2006/102839

PCT Pub. Date: Oct. 5, 2006

(65) Prior Publication Data

US 2008/0112330 A1    May 15, 2008

(30) Foreign Application Priority Data

Mar. 29, 2005    (CN) .................. 2005 1 0059603

(51) Int. Cl.
*H04L 12/26* (2006.01)
(52) U.S. Cl. ............... 370/236.2; 370/241.1; 370/244; 370/248; 370/252; 370/389; 370/400
(58) Field of Classification Search ........... 370/244, 370/389, 392, 241.1, 236.2, 248, 252, 400
See application file for complete search history.

(56) References Cited

U.S. PATENT DOCUMENTS

2003/0112748 A1    6/2003  Puppa et al.

(Continued)

FOREIGN PATENT DOCUMENTS

CN    1427581 A    7/2003

(Continued)

OTHER PUBLICATIONS

"Protection Switching for MPLS networks" ITU-T standard superseded international telecommunication union, Geneva, Apr. 6, 2003.*

(Continued)

*Primary Examiner*—William Trost, IV
*Assistant Examiner*—Toan D Nguyen
(74) *Attorney, Agent, or Firm*—Finnegan, Henderson, Farabow, Garrett, Dunner LLP

(57) ABSTRACT

Embodiments of the present invention disclose a method of domain supervision in a label switched network, including: designating one or more OAM domains on an LSP in the label switched network, determining an ingress node and an egress node of each OAM domain, inserting in-domain OAM frames containing supervision information at the ingress node of each OAM domain, receiving and parsing the in-domain OAM frames by the egress node of each OAM domain, and managing an OAM domain according to the supervision information contained in an in-domain OAM frame of the OAM domain. Furthermore, embodiments of the present invention also disclose a method of domain protection in a label switched network through adding a detection frame, such as Connectivity Verification (CV) frame, Fast Failure Detection (FFD) frame or the like, into an in-domain OAM frame.

16 Claims, 2 Drawing Sheets

U.S. PATENT DOCUMENTS

| | | | |
|---|---|---|---|
| 2005/0099949 A1* | 5/2005 | Mohan et al. | 370/236.2 |
| 2005/0147050 A1 | 7/2005 | Klink | |
| 2005/0226236 A1* | 10/2005 | Klink | 370/389 |
| 2005/0249119 A1* | 11/2005 | Elie-Dit-Cosaque et al. | 370/236 |

FOREIGN PATENT DOCUMENTS

| | | |
|---|---|---|
| CN | 100403687 C | 7/2008 |
| WO | WO 03/039444 | 11/2003 |
| WO | WO 03/091111 | 11/2003 |
| WO | WO 03/094443 | 11/2003 |
| WO | WO 2006/102839 A1 | 10/2006 |

OTHER PUBLICATIONS

PCT International Preliminary Report on Patentability issued Oct. 3, 2007 which contains an English Translation of Written Opinion of the International Searching Authority for PCT Application No. PCT/CN2006/000533, mailed Jul. 13, 2006, 5 pgs.

European Patent Office Communication enclosing an extended European search report which includes, pursuant to Rule 44a EPC, the supplementary European search report (Art. 157(2)(a) EPC) and the European search opinion, dated Sep. 27, 2007, 8 pgs.

International Telecommunication Union; ITU-T Telecommunication Standardization Sector of ITU; Y.1711, "Operation and Maintenance Mechanism for MPLS Networks", Feb. 2004, 33 pgs.

International Telecommunication Union, ITU-T Recommendation Y.1711 "OAM Mechanism for MPLS Networks", Nov. 2002, 26 pgs.

International Telecommunication Union, New ITU-T Recommendation Y.1720 "Protection Switching for MPLS Networks", Apr. 2003, 13 pgs.

* cited by examiner

METHOD OF DOMAIN SUPERVISION AND PROTECTION IN LABEL SWITCHED NETWORK

FIELD OF THE INVENTION

The present invention relates to label switching technology, and particularly, to a method of domain supervision and protection in a label switched network.

BACKGROUND OF THE INVENTION

The Multi-Protocol Label Switching (MPLS) technology, as a key technology in the Next Generation Network, has been playing a more and more important role in Internet Protocol (IP) networks. At the beginning, the MPLS technology was put forward to increase the forwarding speed of routers; however, it has now been widely applied in the fields of traffic engineering, Virtual Private Network (VPN) and Quality of Service (QoS) because of its own advantages and is becoming an important standard in large-scale Internet Protocol (IP) networks.

By further improvement, the MPLS technology has evolved into General MPLS (GMPLS) technology gradually. At present, the GMPLS technology is applicable to packet switched networks, such as Ethernet network, etc. In packet switched networks where the GMPLS technology is applied, data packets are forwarded through label switching technology, therefore the packet switched networks are generally called label switched networks. While the GMPLS technology has become a key technology for a multi-service bearer of IP networks, it has become a pressing issue to manage Label Switched Paths (LSPs) for identifying forwarding routes of data packets in label switched networks.

Particularly, in a label switched network maintained by multiple network operators or a large-scale label switched network maintained by one network operator, an LSP usually goes through multiple domains managed by different manager units. Such an LSP needs not only end-to-end supervision, but also respective supervision of different segments of the LSP in different supervision domains to determine indexes of performance and reliability of all segments of the label switched network.

According to the existing protocols, existing label switched networks can provide an end-to-end Operation and Maintenance (OAM) mechanism for LSPs. However, with respect to an LSP going through multiple supervision domains maintained by multiple network operators or manager units, the OAM mechanism mentioned above may not provide internal performance maintenance and supervision for each supervision domain respectively, but only end-to-end overall performance maintenance and supervision. As a result, it is impossible to determine the QoS of each supervision domain, thus impossible to determine responsibility when an LSP offers poor performance.

SUMMARY OF THE INVENTION

In view of the above, one embodiment of the present invention provides a method of domain supervision in a label switched network to solve a problem of being unable to perform per-domain LSP supervision in the related art.

Another embodiment of the present invention provides a method of domain protection in label switched network to realize per-domain protection of an LSP.

The method provided by the embodiment of the present invention of domain supervision in a label switched network includes:

designating at least one Operation and Maintenance (OAM) domain on a Label Switched Path (LSP) in the label switched network;

determining an ingress node and an egress node of the OAM domain;

inserting in-domain OAM frames containing supervision information at the ingress node of the OAM domain;

receiving and parsing, by the egress node of each OAM domain, the in-domain OAM frames; and managing an OAM domain according to the supervision information contained in the in-domain OAM frames of the OAM domain.

The method provided by the embodiment of the present invention of domain protection in label switched network includes:

designating at least one Operation and Maintenance (OAM) domain on a Label Switched Path (LSP) in the label switched network;

determining an ingress node and an egress node of the OAM domain;

inserting in-domain OAM frames at the ingress node of the OAM domain periodically;

detecting, by the egress node of the OAM domain, the in-domain OAM frames periodically; and if the in-domain OAM frames of an OAM domain cannot be received periodically, determining that a ser vice connection in the corresponding OAM domain is abnormal and notifying the ingress node of the OAM domain to perform protection switching.

The detection frame is one of a Connectivity Verification (CV) frame and a Fast Failure Detection (FFD) frame.

It can be seen that in the method of domain supervision provided by embodiments of the present invention, one or more OAM domains are designated on an LSP and the per-domain supervision of the LSP is achieved through transferring in-domain OAM frames in the OAM domains designated periodically. Moreover, through the methods different segments of a label switched network can be supervised separately so that performance and reliability of different segments of the label switched network may be determined conveniently which facilitates verification of responsibility when the LSP offers poor performance or a failure occurs on the LSP.

Furthermore, in the method of domain protection provided by embodiments of the present invention, one or more OAM domains are designated on an LSP, and the per-domain protection is achieved through periodically sending in-domain OAM frames containing detection frames in the OAM domains designated. Through the method, failures in different OAM domains may be isolated so that a failure in one OAM domain would not affect traffic directions in another OAM domain and reliability of label switched networks is thus enhanced.

EMBODIMENTS OF THE INVENTION

In order to solve the problem in the related art that only end-to-end supervision, but no per-domain supervision, is provided for an LSP in a label switched network, one or more OAM domains are designated on an LSP in embodiments of the present invention and, through transferring in-domain OAM frames in the OAM domains designated, the per-domain supervision of the LSP is thus achieved, e.g., per-domain failure detection or connection protection of the LSP.

The per-domain failure detection includes: sending detection frames by an ingress node of an OAM domain periodically to an egress node of the OAM domain, for example, the ingress node is an ingress Label Switching Router (LSR) and the egress node is an egress LSR, and determining that a segment of the LSP in the OAM domain functions normally if the egress LSR receives the detection frames sent from the ingress LSR of the OAM domain periodically; otherwise, determining that a failure occurs on the segment of the LSP in the OAM domain.

The per-domain connection protection includes: switching, after detecting a failure on a segment of the LSP, a service from the LSP in failure to an LSP functioning normally in the OAM domain where the failure occurs.

The method of domain supervision of an LSP in label switched networks is described in detail hereinafter with reference to an embodiment of the present invention.

Figure 1:
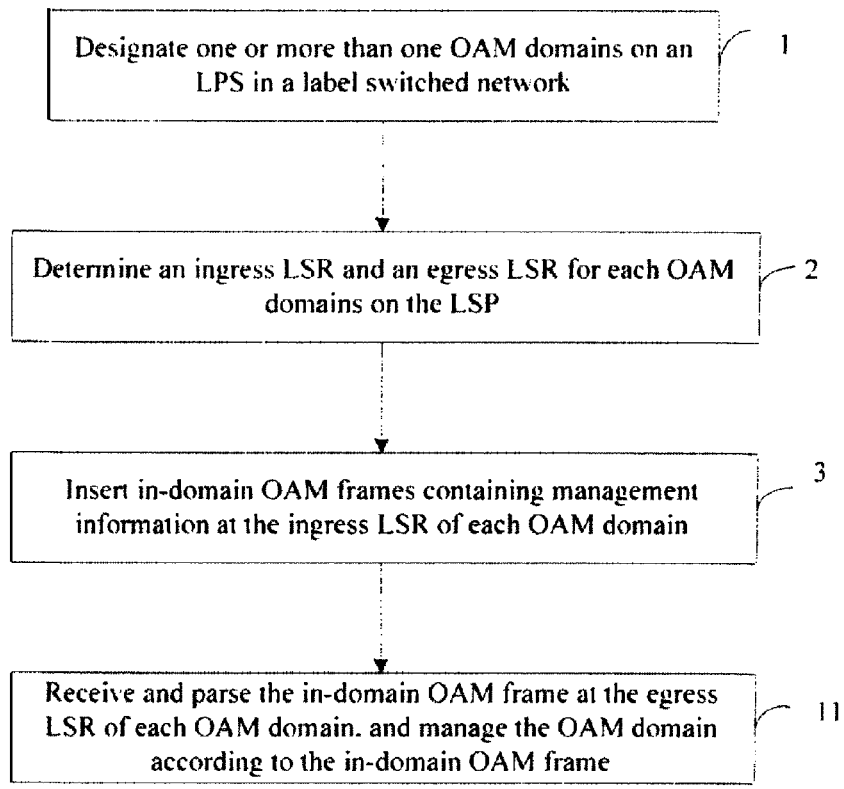
FIG. 1 is a flowchart of a method of domain supervision of an LSP in accordance with an embodiment of the present invention.

FIG. 1 is a flowchart of the method of domain supervision of an LSP in accordance with an embodiment of the present invention. As shown in FIG. 1, the per-domain supervision method includes the following steps.

Step 1: designate one or more OAM domains on an LPS in a label switched network.

Figure 2:
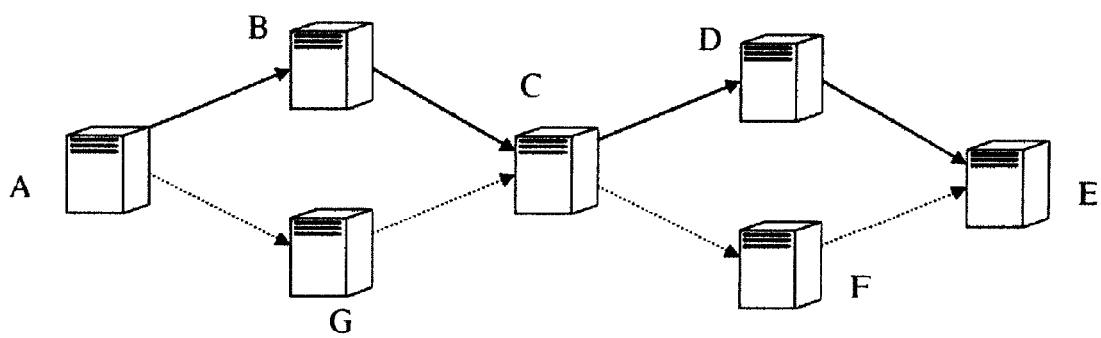
FIG. 2 is a schematic diagram illustrating OAM domains in an embodiment of the present invention.

In Step 1 the OAM domains designated may be consistent with routing domains of the LSP. At this point, the OAM domains are formed naturally when the routing domains of the LSP are formed, As shown in FIG. 2, LSR A, B, C and G form an OAM domain, LSR C, D, E and F form another OAM domain, and LSR C belongs to both domains at the same time. Thus, services sent from LSR A to LSR E should go through two OAM domains.

The OAM domain may not be consistent with the routing domains of the LSP, in such a case, the OAM domains may be designated by configuring, e.g., configuring a specific or random LSR as the border device of a certain OAM domain.

Step 2: determine an ingress LSR and an egress LSR for each OAM domain on the LSP.

With respect to an LSR on an LSP, the LSR is the egress LSR of all OAM domain on the LSP if a next-hop router of the LSR belongs to another OAM domain; or the LSR is the ingress LSR of an OAM domain on the LSP if a last-hop router of the LSR belongs to another OAM domain.

It should be noted in addition that an ingress LSR and an egress LSR of an LSP may also be the ingress LSR and the egress LSR of an OAM domain. With respect to a specific LSP, the ingress LSR and the egress LSR of each OAM domain may be determined by routing protocols or configuring.

Step 3: insert in-domain OAM frames containing supervision information at the ingress LSR of each OAM domain.

In order to identify that the frames transmitted are in-domain OAM frames, the in-domain OAM frames should contain special identifiers for indicating that the OAM frames are in-domain OAM frames.

The in-domain (OAM frame described in the embodiment herein includes: the LSP data label, OAM label and OAM payload, which are encapsulated in a format as follows: containing an OAM label in the LSP data label and carrying the OAM payload therein. The LSP data label is a label used on the LSP data plane, and the intermediate LSRs in the domain forward frames using the LSP data label, but do not process the in-domain OAM frames. The in-domain OAM frames are processed only by the border LSR, e.g., the egress LSR of an OAM domain. The format of an OAM label is the same as that of an ordinary MPLS label, including four fields: label, exp, s and ttl. The label field contains the special identifier which is a special value identifying that the OAM frame is an in-domain OAM frame, e.g., a reserved label value 13 indicates an in-domain OAM frame and distinguishes the in-domain OAM frame from an end-to-end OAM frame. The meanings of the exp, s and ttl fields are the same as those defined in an ordinary MPLS label, which are described in RFC3032.

The OAM payload may include various types of supervision information according to different functions of the OAM payload, e.g. It may include a variety of end-to-end OAM types defined in various standard organizations, including Connectivity Verification (CV), Forward Defect Indication (FDI), etc. Besides, the payload of an in-domain OAM franc e should further include an identifier of the OAM domain for distinguishing one OAM domain from other OAM domains.

Step 4: the egress LSR of the OAM domain receives and parses the in-domain OAM frame, and manages the OAM domain according to the in-domain OAM frame.

The in-domain OAM frame sent periodically by the ingress LSR of an OAM domain goes through all intermediate LSRs in the OAM domain to reach the egress LSR of the OAM domain. The egress LSR of the OAM domain parses the LSP data label in the OAM frame received, and further parses, if there is another label inside the LSP data label, the inside label, and thus determines whether the data frame received is an in-domain OAM frame according to the label value of the label field in the inside label. When the data frame received is an in-domain OAM frame, the egress LSR determines whether the in-domain OAM frame corresponds to current OAM domain according to the OAM identifier in the OAM payload of the in-domain OAM frame. If the in-domain OAM frame corresponds to current OAM domain, the egress LSR further determines an OAM operation needed in the OAM domain according to the indication of the supervision information in the OAM payload, e.g., LSP maintenance or performance monitoring, etc. If, after parsing, the egress LSR determines that the data frame received is not an in-domain OAM frame, the egress LSR simply forwards the frame according to a normal data forwarding process.

In the label switched network shown in FIG. 2, LSR A, B, C and G form an OAM domain and LSR C, D, E and F form another OAM domain. According to per-domain supervision process, in the OAM domain including LSR A, B, C and G, the ingress LSR A of the OAM domain sends an in-domain OAM frame containing supervision information to the egress LSR C of the OAM domain. The OAM domain identifier is also contained in the payload of the in-domain OAM frame. When the egress LSR C receives the in-domain OAM frame, it checks the OAM domain identifier contained in the in-domain OAM frame first and determines that the in-domain OAM frame belongs to the OAM domain which includes LSR A, B, C and G; LSR C, i.e., the egress LSR of the OAM domain, manages the OAM domain according to the supervision information contained in the in-domain OAM frame. According to the same process, in the OAM domain including LSR C, D, E and F, the ingress LSR C of the OAM domain sends an in-domain OAM frame containing supervision information to the egress LSR E of the OAM domain. The OAM domain identifier is also contained in the in-domain OAM frame in the payload. When the egress LSR E receives the in-domain OAM frame, it checks the OAM domain identifier contained in the in-domain OAM frame first and determines that the in-domain OAM frame belongs to the OAM domain which includes LSR C, D, E and F; then LSR E, the egress LSR of the OAM domain, manages the OAM domain according to the supervision information contained in the in-domain OAM frame.

In the embodiment above, as the OAM operations are performed separately in different OAM domains, an OAM operation in one OAM domain would not affect the other OAM domains, thus per-domain supervision of LSP is achieved.

In another embodiment of the present invention, per-domain protection of an LSP may be achieved through the method of domain supervision in which the in-domain OAM frames are detection frames, such as CV frame or FFD frame, etc.

Figure 3:
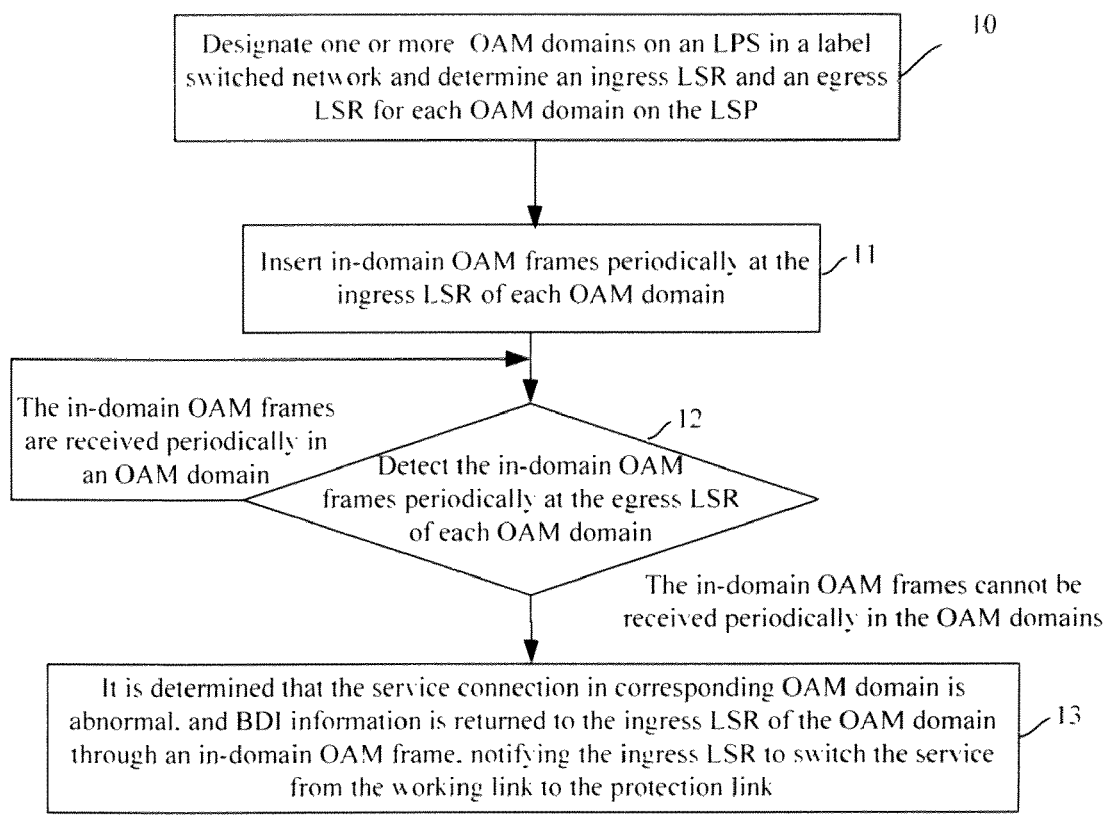
FIG. 3 is a flowchart of a method of domain protection of an LSP in accordance with an embodiment of the present invention.

The method of domain protection of LSP in accordance with an embodiment is described hereinafter with reference to FIG. 3, taking the LSP including LSR A→LSR B →LSR C→LSR D→LSR E shown in FIG. 2 as an example. As shown in FIG. 3, the method includes the following steps.

Step 10: designate one or more OAM domains on the LPS in a label switched network and determine an ingress LSR and an egress LSR for each OAM domain on the LSP.

The process may be performed in the same way as Steps 1 and 2 above.

As shown in FIG. 2, on the LSP including LSR A→LSR B→LSR C→LSR D →LSR E, an OAM domain including LSR A, B, C and G and an OAM domain including LSR D, E, and F are designated. The ingress LSR and the egress LSR of the OAM domain including LSR A, B, C and G are LSR A and LSR C respectively, the link including LSR A →LSR B→LSR C is the working link and the link including LSR A→LSR G→LSR C is the protection link. In addition, the ingress LSR and the egress LSR of the OAM domain LSR C, D, F and F are LSR C and LSR E respectively, the link including LSR C→LSR D→LSR E is the working link and the link including LSR C→LSR F→LSR E is the protection link. The working links and protection links above are established based on routing information or configuring information. Function models in LSR A and LSR C are related to protection types and are the same as functions of source and sink LSRs described in the end-to-end protection mechanism; the protection policy in LSR C is realized through configuring or signaling.

Step 11: insert periodically in-domain OAM frames at the ingress LSR of each OAM domain respectively.

Similar to Step 3, the in-domain OAM frames in this process also need to contain special identifiers to identify that the OAM frames are in-domain OAM frames; the special identifiers can be contained in the label field of OAM label. As described above, a reserved value, e.g., 13, may be assigned to the label field of OAM label in the OAM frames.

In this process, the in-domain OAM frames may be detection frames such as CV frames or FFD frames containing special identifiers, thus the frames may be called in-domain CV frames or in-domain FFD frames.

In the label switched network shown in FIG. 2, in-domain OAM frames, such as in-domain CV frames or in-domain FFD frames, etc., are inserted at the ingress LSRs A and C of the two OAM domains respectively, and are sent to the egress LSRs of the two OAM domains respectively.

Step 12: detect the in-domain OAM frames periodically at the egress LSR of each OAM domain, if the in-domain OAM frames cannot be received periodically in one OAM domain, Step 13 shall be performed; otherwise, it is determined that the service connection in corresponding OAM domains functions normally and it is repeated to receive the in-domain OAM frames in Step 12.

Step 13: determine that the service connection in the OAM domain corresponding to the in-domain OAM frames is abnormal, and Backward Defect Indication (BDI) information is returned to the ingress LSR of the OAM domain through an in-domain OAM frame so as to notify the ingress LSR to switch the service from the working link to the protection link.

In the label switched network shown in FIG. 2, if LSR C and LSR E, the egress LSRs of the two CAM domains, receive periodically in-domain OAM frames in their own OAM domains respectively, such as in-domain CV frames, in-domain FFD frames or the like, they may determine whether the OAM frames received are in-domain OAM frames according to the label field of OAM label in the OAM frames received. If one of the two egress LSRs, e.g., LSR C, cannot receive in-domain OAM frames such as in-domain CV frames or in-domain FFD frames periodically, LSR C determines that a failure occurs in the service connection in the OAM domain including LSR A, B, C and G, and LSR C returns the BDI information through at in-domain OAM frame to the ingress LSR A. Upon receiving the BDI information, the ingress A performs switching in its own OAM domain only, i.e., switches the service from the working link A→B→C to the protection link A→G→C. Preferably, the egress , SR C returns the BDI information to the ingress LSR A on the protection link.

It can be seen from FIG. 2 that the protection switching in the OAM domain between LSR A and LSR C does not affect the OAM domain between LSR C and LSR E. Therefore, per-domain protection in a label switched network is achieved through the method in accordance with the embodiment of the present invention.

Through the per-domain protection method in accordance with the embodiment above, the protection switching in one OAM domain does not affect the other OAM domains, thus different OAM domains on an LSP in the embodiment may adopt different protection mechanisms, e.g., one or several OAM domains on the LSP may adopt the MPLS protection mechanism above, and the other OAM domain(s) may adopt other protection mechanisms such as service layer protection and the like.

The foregoing is only preferred embodiments of the present invention but not for use in limiting protection scope thereof. Those skilled in the art may make numerous changes and variations on the solution of the present invention without departing from the spirit and scope thereof. Accordingly, it is intended that the present invention includes the changes and variations in case that such changes and variations come within the scope as set forth in the appended claims and the equivalent techniques thereof.

What is claimed is:

1. A method of domain supervision in a label switched network, comprising:
   designating at least one Operation and Maintenance (OAM) domain on a Label Switched Path (LSP) in the label switched network;
   determining an ingress node and an egress node of the OAM domain;
   inserting in-domain OAM frames containing supervision information at the ingress node of the OAM domain;
   receiving and parsing, by the egress node of the OAM domain, the in-domain OAM frames; and managing the OAM domain according to the supervision information contained in the in-domain OAM frames of the OAM domain,
wherein said determining the ingress node of the OAM domain comprises:
  determining whether a last-hop node of each node in the OAM domain belongs to an OAM domain other than the OAM domain; and
  if the last-hop node of a node belongs to another OAM domain, determining that the node is the ingress node of the OAM domain; and
wherein said determining the egress node of the OAM domain comprises:
  determining whether a next-hop node of each node in the OAM domain belongs to an OAM domain other than the OAM domain; and
  if the next-hop node of a node belongs to another OAM domain, determining that the node is the egress node of the OAM domain.

2. The domain supervision method of claim 1, wherein the OAM domain is consistent with a routing domain of the LSP and is designated when the routing domain of the LSP is designated.

3. A method of domain supervision in a label switched network, comprising:
  designating at least one Operation and Maintenance (OAM) domain on a Label Switched Path (LSP) in the label switched network;
  determining an ingress node and an egress node of the OAM domain;
  inserting in-domain OAM frames containing supervision information at the ingress node of the OAM domain;
  receiving and parsing, by the egress node of the OAM domain, the in-domain OAM frames; and
  managing the OAM domain according to the supervision information contained in the in-domain OAM frames of the OAM domain,
  wherein
  an in-domain OAM frame comprises: an OAM label and an OAM payload;
  the OAM label contains a special identifier identifying a current frame as the in-domain OAM frame and the OAM payload contains the supervision information and the OAM domain identifier for distinguishing one OAM domain from other OAM domains; and
  said receiving and parsing the in-domain OAM frames comprises:
    determining, by the egress node of the OAM domain, whether a data frame received contains the special identifier upon receiving the data frame;
    determining that the data frame is the in-domain OAM frame if the data frame received contains the special identifier; and
    determining whether the in-domain OAM frame corresponds to the OAM domain in which the egress node is located according to the OAM domain identifier contained in the OAM payload of the in-domain OAM frame;
      if the in-domain OAM frame corresponds to the OAM domain in which the egress node is located, managing the OAM domain according to the supervision information contained in the in-domain OAM frame;
      otherwise, discarding the in-domain OAM frame received.

4. The domain supervision method of claim 3, wherein the special identifier is a reserved label value in a multi-protocol label protocol.

5. A method of domain protection in a label switched network, comprising:
  designating at least one Operation and Maintenance (OAM) domain on a Label Switched Path (LSP) in the label switched network;
  determining an ingress node and an egress node of the OAM domain;
  inserting in-domain OAM frames at the ingress node of the OAM domain periodically;
  detecting, by the egress node of the OAM domain, the in-domain OAM frames periodically; and
  if the in-domain OAM frames of the OAM domain cannot be received periodically, determining that a service connection in the corresponding OAM domain is abnormal and notifying the ingress node of the OAM domain to perform protection switching,
wherein said determining the ingress node of the OAM domain comprises:
  determining whether a last-hop node of each node in the OAM domain belongs to an OAM domain other than the OAM domain; and
  if the last-hop node of a node belongs to another OAM domain, determining that the node is the ingress node of the OAM domain; and
wherein said determining the egress node of the OAM domain comprises:
  determining whether a next-hop node of each node in the OAM domain belongs to an OAM domain other than the OAM domain; and
  if the next-hop node of a node belongs to another OAM domain, determining that the node is the egress node of the OAM domain.

6. The domain protection method of claim 5, wherein the OAM domain is consistent with a routing domain of the LSP and is designated when the routing domain of the LSP is designated.

7. The domain protection method of claim 5, wherein said notifying comprises: returning, by the egress node, Backward Defect Indication (BDI) information to the ingress node of the OAM domain through an in-domain OAM frame.

8. The domain protection method of claim 5, wherein the protection switching comprises: switching, by the ingress node, a service from a working link to a protection link.

9. A method of domain protection in a label switched network, comprising:
  designating at least one Operation and Maintenance (OAM) domain on a Label Switched Path (LSP) in the label switched network;
  determining an ingress node and an egress node of the OAM domain;
  inserting in-domain OAM frames at the ingress node of the OAM domain periodically;
  detecting, by the egress node of the OAM domain, the in-domain OAM frames periodically; and
  if the in-domain OAM frames of the OAM domain cannot be received periodically, determining that a service connection in the corresponding OAM domain is abnormal and notifying the ingress node of the OAM domain to perform protection switching,
  wherein
  an in-domain OAM frame comprises: an OAM label and an OAM payload; the OAM label contains a special identifier identifying a current frame as the in-domain OAM frame and the OAM payload contains an OAM domain identifier for distinguishing one OAM domain from other OAM domains;
said detecting the in-domain OAM frames by the egress node of each OAM domain periodically comprises:
determining, by the egress node of the OAM domain, whether a data frame received contains the special identifier upon receiving the data frame;
determining that the data frame is the in-domain OAM frame if the data frame contains the special identifier; and
determining whether the in-domain OAM frame corresponds to the OAM domain in which the egress node is located according to the OAM domain identifier contained in the OAM payload of the in-domain OAM frame;
if the in-domain OAM frame corresponds to the OAM domain in which the egress node is located, determining that the service connection in the OAM domain corresponding to the egress node operates normally;
otherwise, determining that the service connection in the OAM domain is abnormal and notifying the ingress node of the OAM domain to perform the protection switching.

10. The domain protection method of claim 9, wherein the in-domain OAM frame is one of a Connectivity Verification (CV) frame and a Fast Failure Detection (FFD) frame which contain the special identifier.

11. The domain protection method of claim 9, wherein the special identifier is a reserved label value in a multi-protocol label protocol.

12. A label switched network, comprising: at least one Label Switched Path (LSP) on which at least one Operation and Maintenance (OAM) domain is designated; wherein an OAM domain comprises:
an ingress node, adapted to insert in-domain OAM frames containing supervision information, wherein an in-domain OAM frame comprises: an OAM label and an OAM payload; wherein the OAM label contains a special identifier identifying a current frame as the in-domain OAM frame and the OAM payload contains the supervision information and an OAM domain identifier for distinguishing one OAM domain from other OAM domains; and
an egress node, adapted to determine whether a data frame received contains the special identifier upon receiving the data frame, determine that the data frame is the in-domain OAM frame if the data frame received contains the special identifier, and determine whether the in-domain OAM frame corresponds to the OAM domain in which the egress node is located according to the OAM domain identifier contained in the OAM payload of the in-domain OAM frame; if the in-domain OAM frame corresponds to the OAM domain in which the egress node is located, manage the OAM domain according to the supervision information contained in the in-domain OAM frame; otherwise, discard the in-domain OAM frame received.

13. A label switched network, comprising: at least one Label Switched Path (LSP) on which at least one Operation and Maintenance (OAM) domain is designated; wherein the OAM domain comprises:
an ingress node, adapted to insert in-domain OAM frames periodically, wherein an in-domain OAM frame comprises: an OAM label and an OAM payload; wherein the OAM label contains a special identifier identifying a current frame as the in-domain OAM frame and the OAM payload contains an OAM domain identifier for distinguishing one OAM domain from other OAM domains; and
an egress node, adapted to determine whether a data frame received contains the special identifier upon receiving the data frame; determine that the data frame is the in-domain OAM frame if the data frame contains the special identifier; and determine whether the in-domain OAM frame corresponds to the OAM domain in which the egress node is located according to the OAM domain identifier contained in the OAM payload of the in-domain OAM frame; if the in-domain OAM frame corresponds to the OAM domain in which the egress node is located, determine that the service connection in the OAM domain corresponding to the egress node operates normally; otherwise, determine that the service connection in the OAM domain is abnormal and notify the ingress node of the OAM domain to perform the protection switching.

14. The label switched network of claim 13, wherein the ingress node comprises:
a first module, adapted to receive Backward Defect Indication (BDI) information which the egress node returns to notify the ingress node to perform protection switching; and
a second module, adapted to switch a service from a working link to a protection link.

15. A node of an Operation and Maintenance (OAM) domain for domain supervision, comprising:
a first module, adapted to receive and parse in-domain OAM frames containing supervision information; and
a second module, adapted to manage the OAM domain according to the supervision information contained in the in-domain OAM frames of the OAM domain,
wherein the first module comprises:
a first sub-module, adapted to receive the in-domain OAM frames containing the supervision information;
a second sub-module, adapted to determine whether a data frame received contains a special identifier identifying a current frame as an in-domain OAM frame, and determine that the data frame received is an in-domain OAM frame if the data frame received contains the special identifier;
a third sub-module, adapted to determine whether the in-domain OAM frame corresponds to the OAM domain in which the third sub-module is located according to the special identifier contained in an OAM payload of the in-domain OAM frame;
a fourth sub-module, adapted to notify the second module to manage the OAM domain if the in-domain OAM frame corresponds to the OAM domain in which the third sub-module is located; and
a fifth sub-module, adapted to forward a frame according to a normal data forwarding process if the in-domain OAM frame does not correspond to the OAM domain in which the third sub-module is located.

16. A node of an Operation and Maintenance (OAM) domain for domain protection, comprising:
a first module, adapted to receive and detect in-domain OAM frames;
a second module, adapted to determine that a service connection in the corresponding OAM domain is abnormal, if the in-domain OAM frames of an OAM domain cannot be received periodically; and
a third module, adapted to notify an ingress node of the OAM domain to perform protection switching;

wherein the second module comprises:
- a first sub-module, adapted to determine whether a data frame received contains a special identifier upon receiving the data frame;
- a second sub-module, adapted to determine that the data frame is an in-domain OAM frame if the data frame contains the special identifier;
- a third sub-module, adapted to determine whether the in-domain OAM frame corresponds to the OAM domain in which the node is located according to the special identifier contained in an OAM payload of the in-domain OAM frame; if the in-domain OAM frame corresponds to the OAM domain in which the node is located, determine that the service connection in the OAM domain corresponding to the node operates normally; otherwise, determine that the service connection in the OAM domain is abnormal and notify the ingress node of the OAM domain to perform the protection switching.

* * * * *